US012806990B2

(12) United States Patent
Favaretto

(10) Patent No.: US 12,806,990 B2
(45) Date of Patent: Nov. 24, 2026

(54) MOTOR VEHICLE WITH AN IMPROVED ARRANGEMENT OF INTAKE AIR INTERCOOLERS

(71) Applicant: FERRARI S.P.A., Modena (IT)

(72) Inventor: Fabrizio Favaretto, Modena (IT)

(73) Assignee: FERRARI S.P.A. (IT)

( * ) Notice: Subject to any disclaimer, the term of this patent is extended or adjusted under 35 U.S.C. 154(b) by 281 days.

(21) Appl. No.: 18/619,606

(22) Filed: Mar. 28, 2024

(65) Prior Publication Data

US 2024/0326578 A1 Oct. 3, 2024

(30) Foreign Application Priority Data

Mar. 28, 2023 (IT) ........................ 102023000005865

(51) Int. Cl.
*B60K 11/08* (2006.01)

(52) U.S. Cl.
CPC .................................... *B60K 11/08* (2013.01)

(58) Field of Classification Search
CPC ..... B60K 11/08; B60K 13/02; F02B 29/0437; F02B 39/04; F02B 29/0462
See application file for complete search history.

(56) References Cited

U.S. PATENT DOCUMENTS 2,852,084 A 9/1958 Wilhelm
9,399,974 B2 * 7/2016 Ito .................... F02M 35/10157
9,518,504 B2 * 12/2016 Tanaka ................ F02B 29/0437
9,957,928 B2 * 5/2018 Watanabe ............... F02B 39/00
10,119,458 B2 * 11/2018 Kai ......................... F02B 39/12
10,247,088 B2 * 4/2019 Hamaguchi ............. F02B 37/00
12,077,044 B2 * 9/2024 Nukada ..................... F01P 3/20
2007/0059997 A1 * 3/2007 Mineo ..................... B63B 34/10 440/88 C
2010/0175946 A1 * 7/2010 Karube ............... F04C 18/0223 123/563
2012/0277971 A1 11/2012 Jensen
2018/0283265 A1 10/2018 Dalmas, II et al.
2024/0066979 A1 * 2/2024 Favaretto ............. B60K 15/063
2024/0068395 A1 * 2/2024 Favaretto ................ F02B 33/40
2024/0068397 A1 * 2/2024 Favaretto ................ F02B 39/12
2024/0326578 A1 * 10/2024 Favaretto ............ F02B 29/0437

OTHER PUBLICATIONS

Search Report issued in Italian Patent Application No. 102023000005865.

* cited by examiner

*Primary Examiner* — Joseph J Dallo
(74) *Attorney, Agent, or Firm* — The Belles Group, P.C.

(57) ABSTRACT

A motor vehicle is described, the former including an internal combustion engine, an intake assembly with an intake manifold and at least one intake line for conveying air to the intake manifold, wherein the intake line has a compression assembly configured to increase the pressure of the air conveyed to the intake manifold and at least one intercooler downstream of the compression assembly, wherein the compression assembly is arranged behind the internal combustion engine according to a roll axis of the vehicle, wherein the intercooler is of the air/liquid type and is arranged side by side with the compression assembly.

15 Claims, 10 Drawing Sheets

MOTOR VEHICLE WITH AN IMPROVED ARRANGEMENT OF INTAKE AIR INTERCOOLERS

CROSS-REFERENCE TO RELATED APPLICATION

This patent application claims priority from Italian patent application no. 102023000005865, filed on Mar. 28, 2023, the entire disclosure of which is incorporated herein by reference.

TECHNICAL FIELD

The invention relates to a motor vehicle provided with an internal combustion engine and a particular arrangement of intercoolers for cooling the intake air of the engine.

BACKGROUND

The motor vehicle market is constantly seeking technical improvements with the aim of, for example, increasing performance, driving pleasure, efficiency, etc. Furthermore, the technical improvements may also or may only be directed towards a reduction in weight, dimensions and cost. One of the main or most sought-after aspects of improvement is the general improvement of vehicle aerodynamics. To achieve this type of improvement, vehicle manufacturers usually try to redesign the chassis and vehicle body.

On the other hand, the possibility of modifying the shape and construction of the chassis often clashes with the requirements of a correct and efficient distribution of the overall dimensions, with particular reference to the devices necessary for the operation of the vehicle's drivetrain.

If the drivetrain is an internal combustion engine, the devices to be placed in the available volumes determined by the chassis include at least the gearcase, tanks, intake apparatus, exhaust apparatus, distribution apparatus, in addition to the engine itself, and preferably the devices for the boost power of the engine.

In this context, there is a need to design an aerodynamically improved vehicle, in particular by identifying an appropriate configuration of the auxiliary devices for engine operation.

An aim of the invention is to meet the above need, preferably in a simple and reliable manner.

DESCRIPTION OF THE INVENTION

The aim may be achieved by the present invention. In one aspect, the invention can be a motor vehicle comprising an internal combustion engine having a crankcase and a plurality of cylinders within the crankcase, and an intake assembly including an intake manifold communicating with the cylinders and at least one intake line configured to convey air to the intake manifold, where the intake line includes a compression assembly configured to increase the pressure of the air conveyed to the intake manifold and at least one intercooler downstream of the compression assembly, where the compression assembly is arranged behind the internal combustion engine according to a roll axis of the motor vehicle, and where the intercooler is of the air/liquid type and is arranged side by side with the compression assembly.

In an embodiment, the compression assembly is aligned with the internal combustion engine, in particular along a direction parallel to the roll axis.

In an embodiment, the motor vehicle further includes an additional air/liquid type intercooler, wherein the compression assembly is arranged between the intercoolers along a pitch axis of the motor vehicle.

In an embodiment, the motor vehicle further includes a plurality of wheels and a transmission apparatus configured to connect the internal combustion engine to the wheels, the transmission apparatus including a gearbox aligned with the internal combustion engine according to the roll axis and arranged behind the internal combustion engine, where the intercooler is arranged side by side with the gearbox.

In an embodiment, at least a portion of the intercooler is arranged above the gearbox.

In an embodiment, the compression assembly has at least one portion arranged immediately above the gearbox.

In an embodiment, the compression assembly is connected to the internal combustion engine, such that the internal combustion engine drives, in use, the compression assembly.

In an embodiment, the internal combustion engine comprises a cylinder head coupled to the crankcase and arranged below the crankcase, in particular so as to close the cylinders from below.

In one aspect, the invention can be a motor vehicle comprising a front, a rear, a longitudinal vehicle axis extending between the front and the rear, a lateral vehicle axis orthogonal to the longitudinal vehicle axis, a first lateral side extending between the front and the rear, a second lateral side extending between the front and the rear, an internal combustion engine comprising a crankcase and a plurality of cylinders, and an air intake comprising an intake manifold in communication with the cylinders, an intake line configured to convey air to the intake manifold, a compressor configured to increase the pressure of the air conveyed to the intake manifold, and an intercooler downstream of the compressor, wherein the compressor is arranged at least partially rearwardly with respect to the internal combustion engine according to the lateral vehicle axis, and wherein the intercooler is an air/liquid type intercooler and is arranged at least partially laterally with respect to the compressor.

In one aspect, the invention can be a motor vehicle comprising a front, a rear, a first lateral side extending between the front and the rear, a second lateral side extending between the front and the rear, an internal combustion engine comprising a crankcase and a plurality of cylinders, and an intake assembly comprising an intake manifold in communication with the cylinders, an intake line configured to convey air to the intake manifold, a compression assembly configured to increase the pressure of the air conveyed to the intake manifold, and an intercooler downstream of the compression assembly, wherein the compression assembly is arranged rearwardly with respect to the internal combustion engine according to a roll axis of the motor vehicle, and wherein the intercooler is an air/liquid type intercooler and is arranged laterally with the compression assembly.

BRIEF DESCRIPTION OF THE DRAWINGS

In the following, an embodiment of the invention is described for a better understanding thereof by way of a non-limiting example and with reference to the accompanying drawings, wherein.

DETAILED DESCRIPTION OF THE INVENTION

Figure 1:
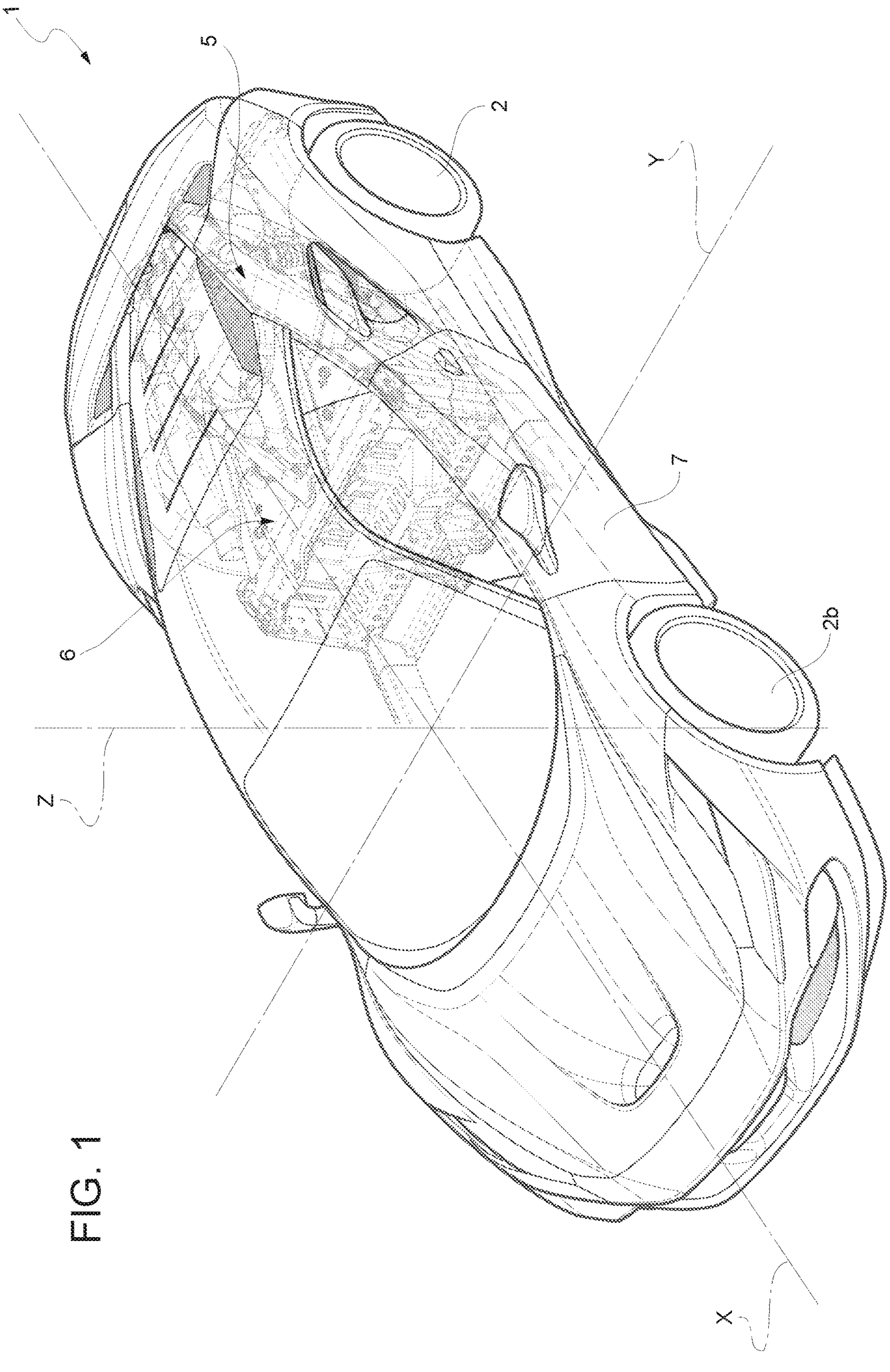
FIG. 1 is a perspective view of a motor vehicle according to the invention.

In FIG. 1, the reference number 1 is used to indicate, as a whole, a motor vehicle provided with two rear wheels 2, in particular drive wheels, receiving torque from an internal combustion engine 3.

FIG. 1 shows a Cartesian system of axes X, Y, Z, respectively coinciding with a roll axis, a pitch axis, and a yaw axis of the motor vehicle 1. The axis X coincides with the direction of travel of the motor vehicle 1; the axis Y is horizontal and orthogonal to the axis X; the axis Z is orthogonal to the axes X, Y.

The internal combustion engine 3 is connected to wheels 2 by means of a transmission apparatus comprising a gearbox 4 and, preferably, a differential of a known type, not illustrated.

The motor vehicle 1 further comprises a body 5, itself comprising a chassis 6 and a bodywork 7 carried by the chassis 6 and defining, inter alia, the exterior surfaces of the motor vehicle 1.

The motor vehicle 1 further comprises a bottom 8 having a surface facing, in use, the road travelled by the motor vehicle 1.

The internal combustion engine 3 could be powered by different types of fuel, including for example petrol, diesel, synthetic fuel, etc., as long as the fuel is preferably normally in a liquid state. For the sake of clarity, the term normally refers to ambient temperature and pressure conditions.

To contain the fuel, the motor vehicle 1 further comprises two tanks 10 arranged at the respective sides of the internal combustion engine 3, in particular in front of the internal combustion engine 3 or at a front end of the internal combustion engine 3.

For the sake of clarity, terms such as front, rear, in front of, behind, back, etc. refer to the direction of travel of the motor vehicle 1 during use.

Therefore, the internal combustion engine 3 is arranged between the tanks 10 according to the pitch axis of the motor vehicle 1. More in particular, the internal combustion engine 3 is arranged directly between the tanks 10, according to the pitch axis. In other words, according to the pitch axis, there are no other components interposed between the internal combustion engine 3 and the tanks 10.

The tanks 10 are carried by the chassis 6 in a fixed position with respect thereto.

Preferably, the at least one of the tanks 10 has at least one section with a substantially triangular or trapezoidal shape according to a horizontal plane, more precisely including the roll axis or the direction of travel of the motor vehicle 1, i.e., a plane orthogonal to the yaw axis of the motor vehicle 1.

As can be derived for example from the drawings, the term substantially herein implies a form which technically resembles a strict form while having, for example, chamfered vertices, connected edges, slightly curved portions in place of one or more edges, irregular small sections at portions of one or more edges, localized recesses, and the like.

The shape of the above section is tapered, in greater detail, towards the back of the motor vehicle 1.

Preferably, both tanks 10 have respective sections with a tapered shape according to a section plane orthogonal to the yaw axis; in greater detail, the sections are tapered towards the back of the motor vehicle 1.

Specifically, the chassis 6 has a portion, in particular rear, forming a cell 6*b*, which in turn defines a compartment which receives the internal combustion engine 3, i.e., an engine compartment of the motor vehicle 1.

The cell 6*b* has a substantially trapezoidal shape as it comprises beams 6*c*, which form a grid or backbone extending substantially on two planes orthogonal to the roll axis, the planes forming in practice the bases of the trapezoidal shape, and on two ideal surfaces forming in practice the sides of the trapezoidal shape.

The minor base of the trapezoidal shape is rear with respect to the major base.

The ideal surfaces or sides are preferably curved and with concavity towards the outside of the motor vehicle 1.

The concavities have respective areas of maximum recess towards the roll axis at the rear wheels 2.

Thereby, the body 5 forms respective lateral aerodynamic channels 12 between the sides of the cell 6*b* and the rear wheels 2.

More generally, the sides tend to converge towards the roll axis, thus forming the lateral aerodynamic channels 12 between the sides themselves and the rear wheels 2.

In fact, the sides could also be flat, for example.

In other words, the body 5 is tapered or the sides are tapered towards the rear, thus forming the lateral aerodynamic channels 12.

Specifically, the cell 6*b* has an upper grid structure 6*d* on a plane orthogonal to a yaw axis of the motor vehicle 1 or a vertical axis.

The upper grid structure 6*d* delimits the engine compartment above and comprises two crossbeams 11 parallel to the pitch axis and two beams 13 extending on the sides of the cell 6*b* so as to essentially form a trapezoid with the crossbeams 11.

Furthermore, the upper grid structure 6*d* comprises two oblique beams 14, which diverge from an intermediate zone of one of the crossbeams 11, in particular the frontmost one, ending at respective vertices formed by the intersections of the beams 13 with the other of the crossbeams 11.

Thereby, the oblique beams 14 delimit three triangular areas corresponding to three portions of the engine compartment respectively delimited above by the three triangular areas. The three portions of the engine compartment have triangular, or more precisely, prismatic shapes with triangular bases.

Of the three portions of the engine compartment, the central one receives the internal combustion engine 3, while the remaining ones receive the tanks 10, respectively.

In particular, the tanks 10 completely occupy at least the corresponding two triangular areas and preferably the entire two portions of the engine compartment.

The tanks 10 preferably have the same or similar width in the pitch axis and the same or similar depth in the roll axis.

Furthermore, the tanks 10 have different heights according to the yaw axis.

Therefore, of the tanks 10, the highest one will be indicated as first tank, while the other will be indicated as second tank.

The first tank has or defines an internal volume comprising a portion 10*a* having a height equal to or greater than that of the internal volume 10*b* of the second tank; furthermore, the internal volume of the first tank comprises a portion 10*c* below the portion 10*a* and directly communicating with the portion 10*a*.

In other words, the tanks 10 have respective upper ends having the same height or elevation level, while the first tank has a lower end having a lower height or elevation level than a lower end of the second tank.

Still in other words, the boundary between the portions 10*a*, 10*c* is arranged at the same height or at the same elevation, according to the yaw axis, as that of the bottom of the second tank or its internal volume 10*b*.

Still in other words, the second tank extends above the portion 10*c*, viz., in a zone having a height or elevation level above that of the portion 10*c*.

In practice, the portion 10*c* defines a "nourice" of the first tank.

The tanks 10 communicate with each other; the motor vehicle 1 comprises a pipe 15 which puts the tanks 10 in communication.

The pipe 15 has two open ends at the portion 10*a* of the first tank and the internal volume 10*b* of the second tank, respectively. In other words, the ends of pipe 15 communicate directly with the portion 10*a* and with the internal volume 10*b*, respectively.

The pipe 15 has an axis, which can extend entirely on a plane orthogonal to the yaw axis.

Alternatively, each of the two end sections of the pipe 15 can be inclined slightly downwards with respect to the plane orthogonal to the yaw axis. Herein, the term slightly refers to an inclination less than 20°, more preferably less than 10°.

In the latter case, the axis of the pipe 15 could have an intermediate section extending on the plane orthogonal to the yaw axis. For example, the ends or inclined end sections of the pipe 15 extend directly from the intermediate section towards the respective tanks 10.

In general, the pipe 15 could comprise an intermediate section with a straight axis parallel to the pitch axis. Specifically, the intermediate section is arranged in front with respect to the tanks 10, according to the direction of travel of the motor vehicle 1.

Figure 8:
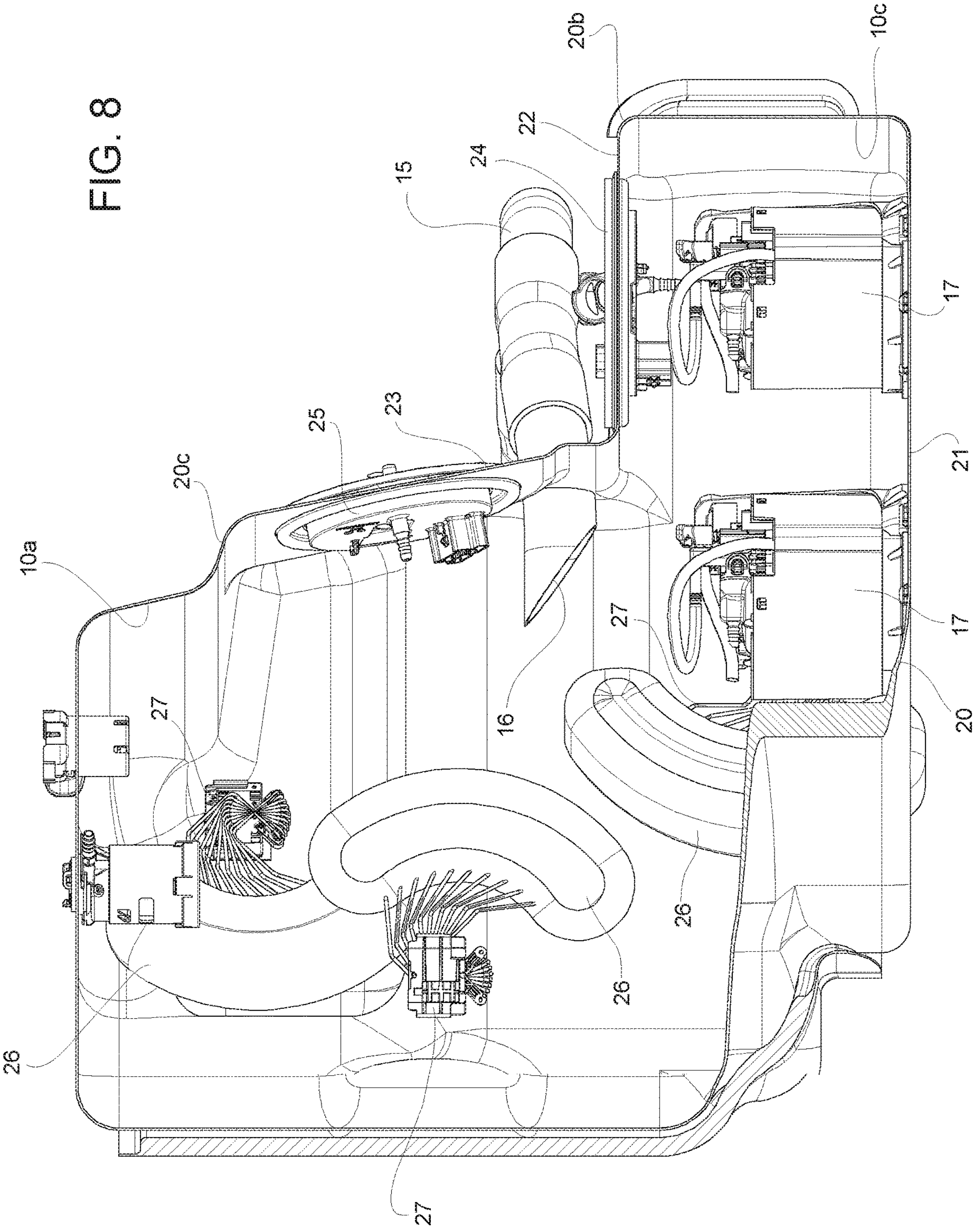
FIG. 8 is a side section of the tank assembly.

FIG. 8 shows a section of the first tank on a section plane orthogonal to the pitch axis. The end of the pipe 15 visible in FIG. 8 ends with an outline 16, the projection of which on the section plane is oblique with respect to the plane orthogonal to the yaw axis and facing downwards.

In other words, the end of the pipe 15 ends with an inlet opening facing the bottom of the first tank, viz., facing the portion 10*c* or downwards, although the opening communicates directly with the portion 10*a*.

The motor vehicle 1 comprises one or more pumps 17 to draw fuel from the tanks 10 and supply fuel to the internal combustion engine 3, e.g., through a known and not illustrated supply line.

Preferably, all the pumps 17 are arranged within the portion 10*c* and more precisely on the bottom of the portion 10*c*, viz., the first tank.

As can be seen from FIG. 8, the portion 10*c* is externally delimited by a portion 20 or shell of the first tank. Similarly, the portion 10*a* is delimited by another portion or shell 20*c* of the first tank.

In turn, the portion 20 comprises an end 20*b* projecting forwards or towards the front of the motor vehicle 1 with respect to the rest of the portion 20 according to the roll axis.

Therefore, the end 20*b* projects forwards or towards the front of the motor vehicle 1 with respect to the portion 20*c*, according to the roll axis.

The end 20*b* comprises a lower wall 21 forming part of the bottom of the first tank and an upper wall 22 facing the lower wall 21.

The upper wall 22 projects cantilevered along the roll axis with respect to a wall 23 extending upwards. The wall 23 could be part of the end 20*b*, but not necessarily; the wall 23 is more generally part of the first tank and could delimit a zone of the portion 10*a*, instead of or in addition with respect to a zone of the portion 10*c*.

Preferably, the upper wall 22 has an opening for inspecting one of the pumps 17 arranged immediately below the opening itself.

Regardless of the presence or absence of the previous opening, the wall 23 has another opening for inspecting another of the pumps 17 arranged in a zone of the portion 10*c* not directly delimited by the end 20*b*, viz., within the remainder of the portion 20 with respect to the end 20*b*, viz., immediately below the portion 10*a*.

The first tank comprises covers 24, 25 which close the openings on the walls 22, 23 for inspecting the pumps 17, but can be opened manually if necessary.

The volume delimited by the end 20*b* and thus forming part of portion 10*c* is arranged in an advanced position with respect to the portion 10*a*, with reference to the direction of travel of the motor vehicle 1.

The pumps 17, in particular those which can be inspected by means of the openings in the walls 22, 23, are preferably aligned according to the roll axis and located, in particular, on the bottom of the first tank or the portion 10*c*.

More in particular, all the pumps 17 are aligned along a single straight axis parallel to the roll axis.

Within the first tank, specifically, the motor vehicle 1 comprises one or more floats 26 and respective detection devices 27 configured to determine the position of the floats 26.

The function and construction features of the floats 26 and the relative detection devices 27 are known per se, whereby they will not be described in detail.

Preferably, all the floats 26 are arranged within the first tank.

Therefore, the motor vehicle 1 has no pumps and/or floats within the second tank. In other words, the second tank does not contain pumps and/or floats therein.

More in particular, the second tank does not contain any type of device therein, viz., it is adapted to contain only and exclusively the fuel, in addition, of course, to the air normally present in the environment.

Figure 5:
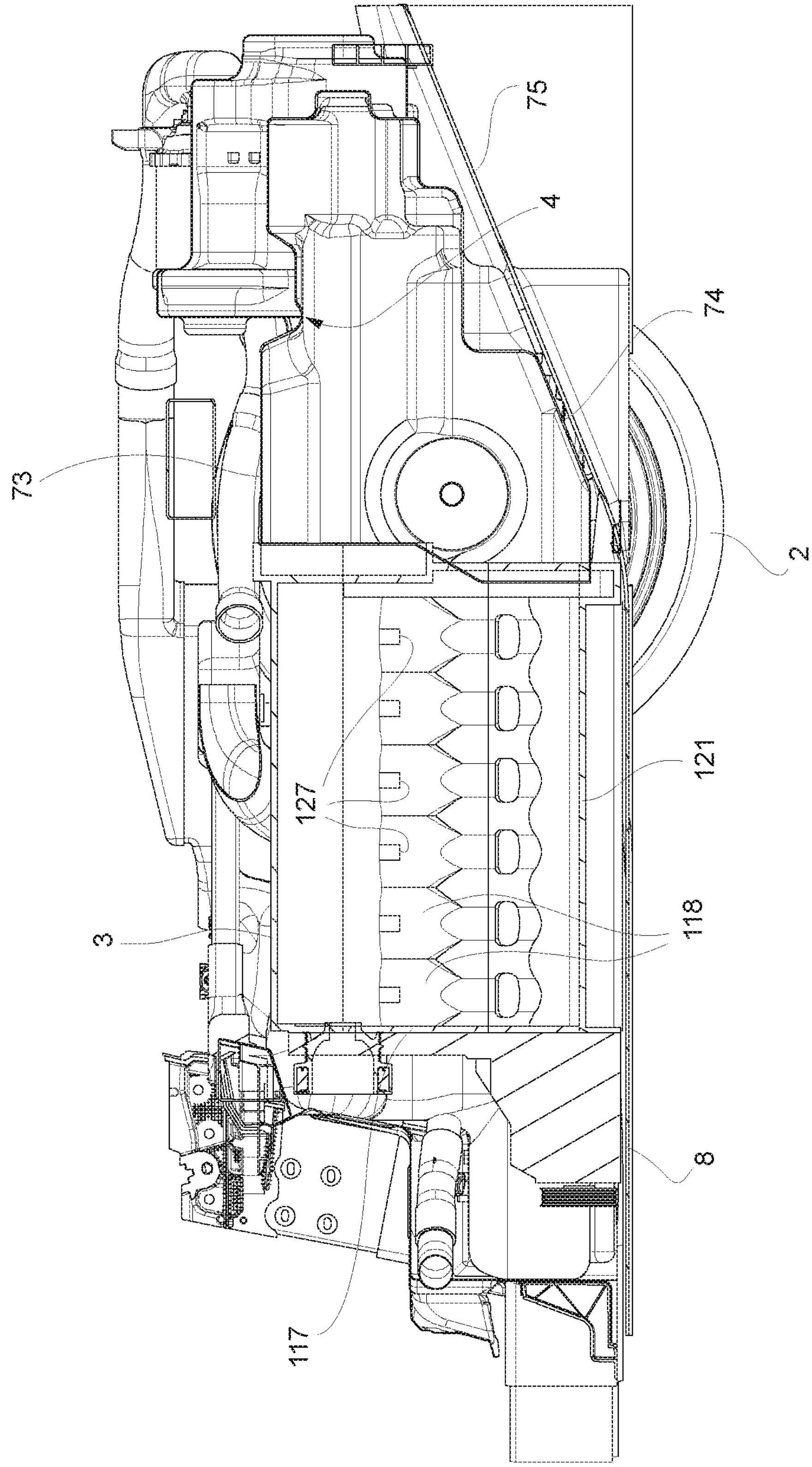
FIG. 5 is a side view of the rear portion of FIG. 2.
Figure 6:
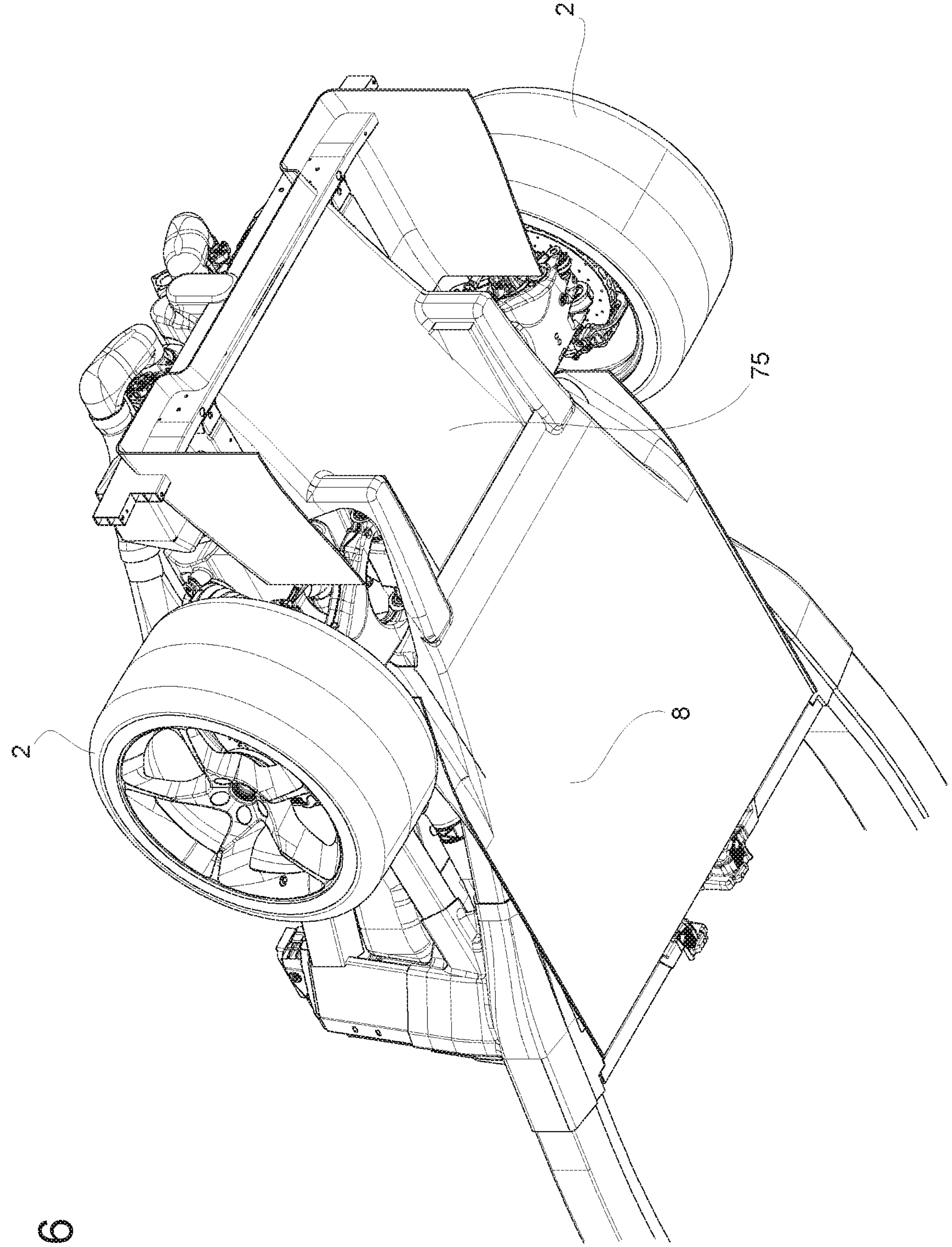
FIG. 6 is a perspective view from below of the rear portion of FIG. 2.
Figure 7:
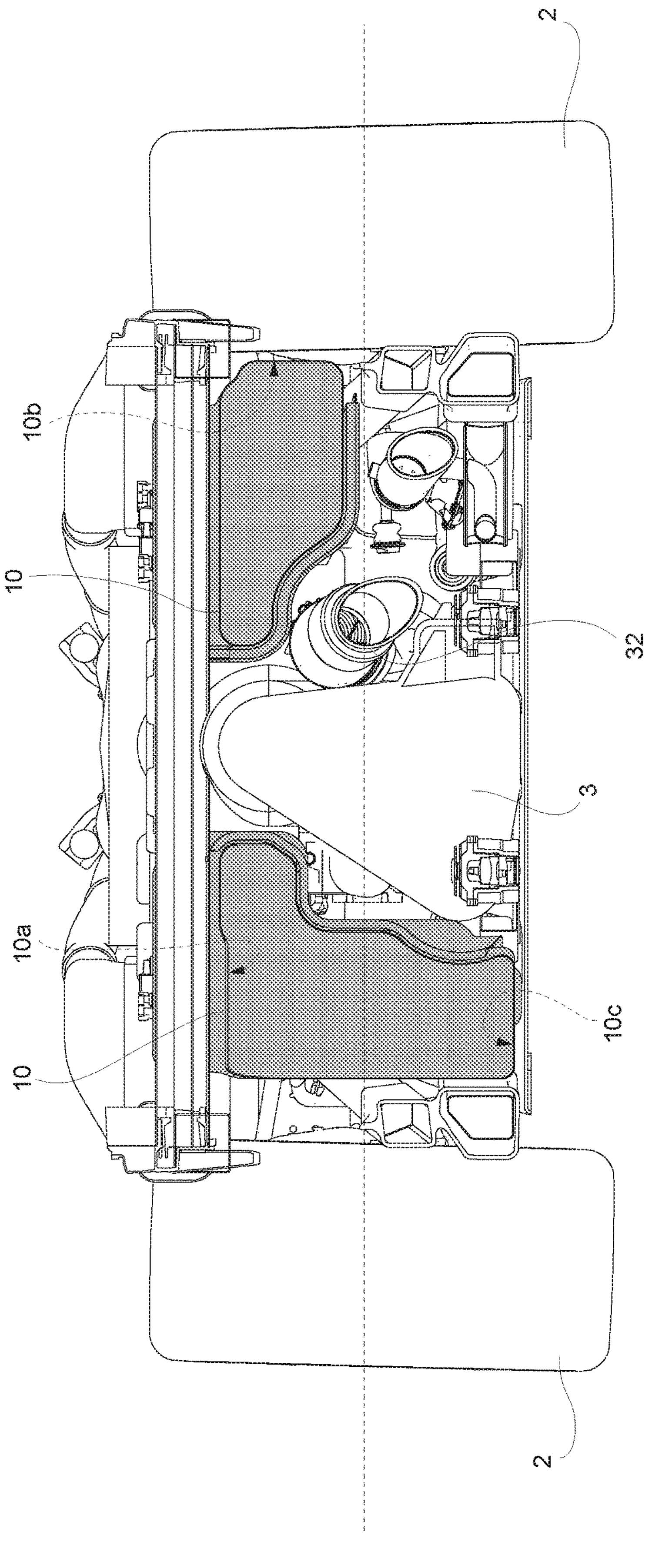
FIG. 7 is a front view of the rear portion of FIG. 2, with parts removed to highlight the arrangement of the tank assembly.

According to what is illustrated in FIG. 5, the internal combustion engine 3 comprises a crankcase 117 within which a plurality of cylinders 118 are obtained.

Preferably but not compulsorily, the cylinders 118 are arranged in a line, viz., aligned along a straight axis, specifically parallel or more precisely coinciding with the roll axis, as this solution allows to reduce the transverse dimensions of the internal combustion engine 3 and thus, among other things, allows to leave more space for the tanks 10. In the embodiment shown in the accompanying drawings, six in-line cylinders 118 are provided, but of course the number and arrangement of the cylinders 118 could be different.

Each cylinder 118 has a respective combustion chamber and a respective piston 119 mechanically connected to a crankshaft 120 (by means of a respective connecting rod) to transmit the force generated by the combustion to the crankshaft 120 itself.

A cylinder head 121 is coupled (connected) to the crankcase 117, which forms in particular the ceiling of the cylinders 118 (viz., the closure of the cylinders 118, in particular the "flame plate"). In the case of an in-line arrangement of the cylinders 118, a single cylinder head 121 is provided, while in the case of a "V" arrangement of the cylinders 118, twin cylinder heads 121 are provided for the two banks of cylinders 118.

The set of the crankcase 117 and cylinder head 121 together constitute the cylinder block of the internal combustion engine 3.

The cylinder head 121 is configured to close the cylinders 118 obtained on the crankcase 117.

In the embodiment illustrated in the accompanying drawings, the internal combustion engine 3 is arranged (oriented) longitudinally, viz., the crankshaft 120 is arranged (oriented) longitudinally, viz., parallel to the roll axis, as this solution allows to reduce the transverse footprint of the internal combustion engine 3 and thus, among other things, leave more space for the tanks 10. According to other embodiments not illustrated, the internal combustion engine 3 is arranged (oriented) transversely, viz., with the crankshaft 120 oriented parallel to the pitch axis.

In the embodiment illustrated in the accompanying figures, the internal combustion engine 3 is arranged in a central and/or rear position according to the roll axis, viz., the internal combustion engine 3 is arranged behind a passenger compartment (not illustrated) of the motor vehicle 1 and is located between the passenger compartment and the rear wheels 2 (central arrangement as illustrated in the accompanying drawings) or is located beyond the rear wheels 2 (rear arrangement not illustrated).

Furthermore, in the embodiment illustrated in the accompanying drawings, the internal combustion engine 3 is arranged in a central position along the pitch axis, viz., along the roll axis.

Figure 10:
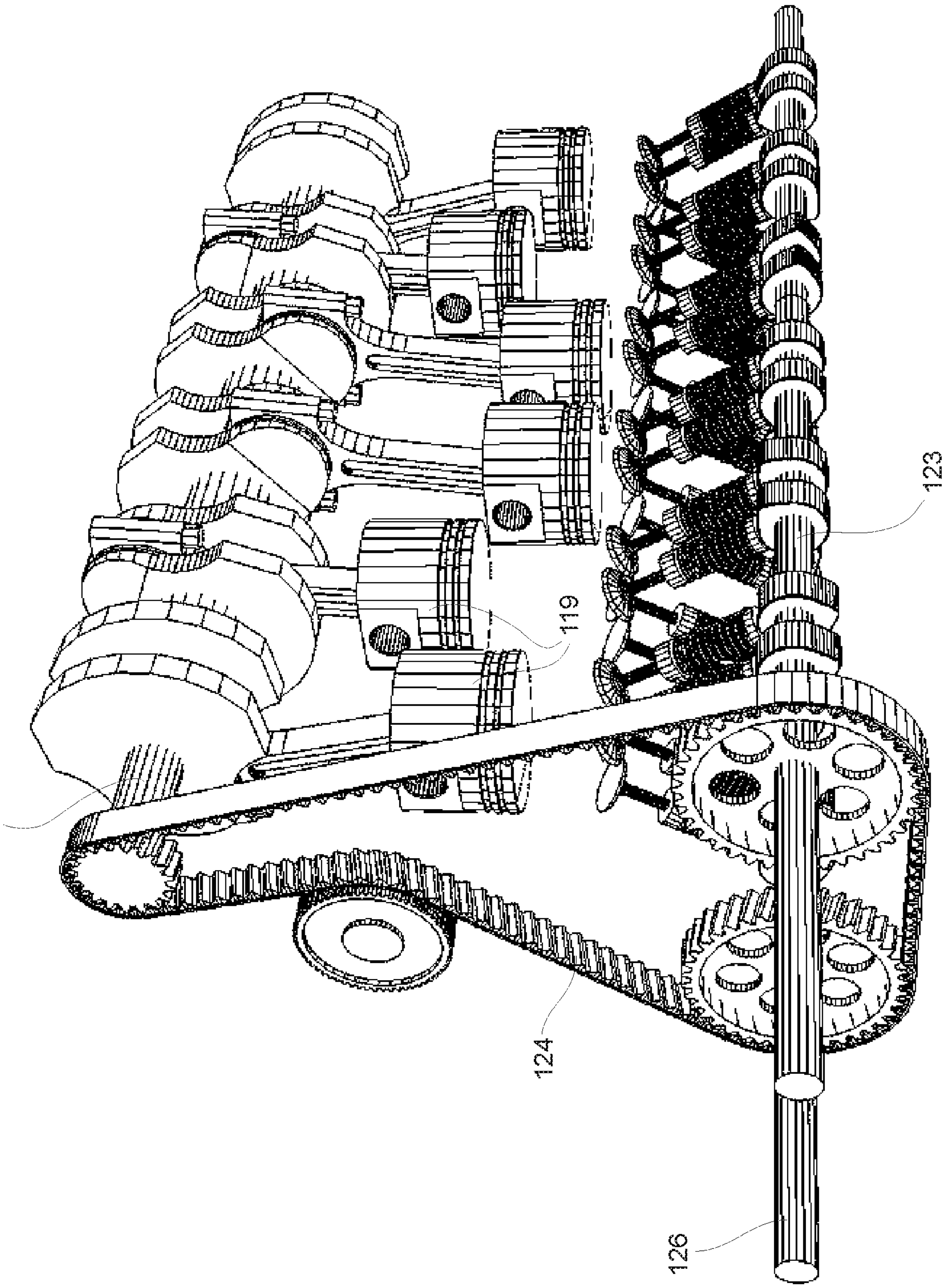
FIG. 10 is a schematic perspective view of components of an internal combustion engine of the motor vehicle of FIG. 1.

Each cylinder 118 comprises two intake valves controlled by a camshaft 123 which receives motion from the crankshaft 120 by means of a belt drive 124 (FIG. 10); as an alternative to the belt drive 124, a different type of drive could be used, for example a chain drive or a gear drive. Furthermore, each cylinder 118 comprises two exhaust valves controlled by a camshaft 126 which receives motion from the crankshaft 120 by means of the belt drive 124. The intake valves, exhaust valves and corresponding control means, which are known per se and comprising return springs and camshafts 123, 126, are housed in the cylinder head 121.

Each cylinder 118 further comprises (at least) one injector 127 (schematically illustrated) configured to cyclically inject fuel in the cylinder 118.

The injector 127 is supplied by the pumps 17 by means of the above-mentioned supply line.

The fuel injection in the cylinder 118 could be direct but also partially or completely indirect, without any loss of generality.

Each cylinder 118 further comprises at least one ignition device or spark plug, not illustrated, adapted to be cyclically activated to trigger the ignition of a mixture of air (combustion agent) and fuel present in the combustion chamber, in particular at the end of the compression step.

According to what is illustrated in the accompanying drawings, the internal combustion engine 3 is oriented vertically with the crankshaft 120 arranged higher than the cylinders 118. In other words, the internal combustion engine 3 is arranged "upside down" with respect to the traditional arrangement whereby the cylinders 118 are at the top and the crankshaft 120 is at the bottom.

The cylinder head 121 which forms the ceiling of the cylinders 118 is arranged below the crankcase 117 and in particular represents the lowest part of the internal combustion engine 3.

In other words, the cylinder head 121 faces, in use, towards the road travelled by the motor vehicle 1.

The cylinder head 121 closes the cylinders 118 from the bottom or below.

The motor vehicle 1 comprises an intake assembly 29 configured to draw air from the external environment and convey the drawn air into the cylinders 118 of the internal combustion engine 3 (the entry of air into the cylinders 118 is regulated by the aforementioned intake valves).

The intake assembly 29 comprises an intake manifold communicating with all the cylinders 118; preferably, the entrance of air into the intake manifold is regulated by a throttle valve.

Furthermore, the motor vehicle 1 comprises an exhaust assembly 32 configured to discharge the exhaust gases from the cylinders 118 of the internal combustion engine 3 into the external environment.

Among other things, the exhaust assembly 32 comprises (at least) one exhaust gas treatment device 33, for example comprising a catalyst of a known type, not illustrated.

Figure 2:
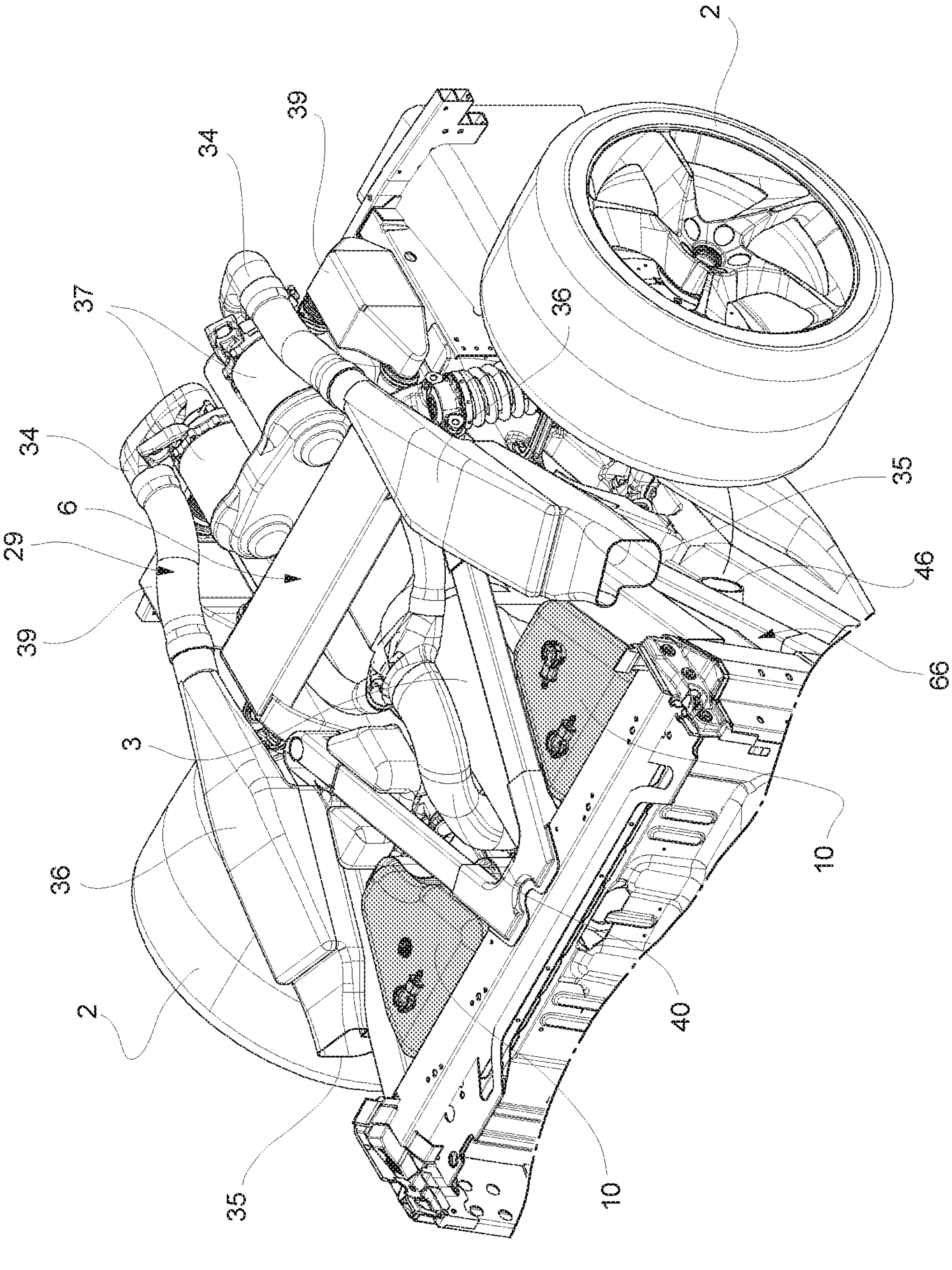
FIG. 2 is a perspective view, to an enlarged scale, of a rear portion of the motor vehicle of FIG. 1.
Figure 3:
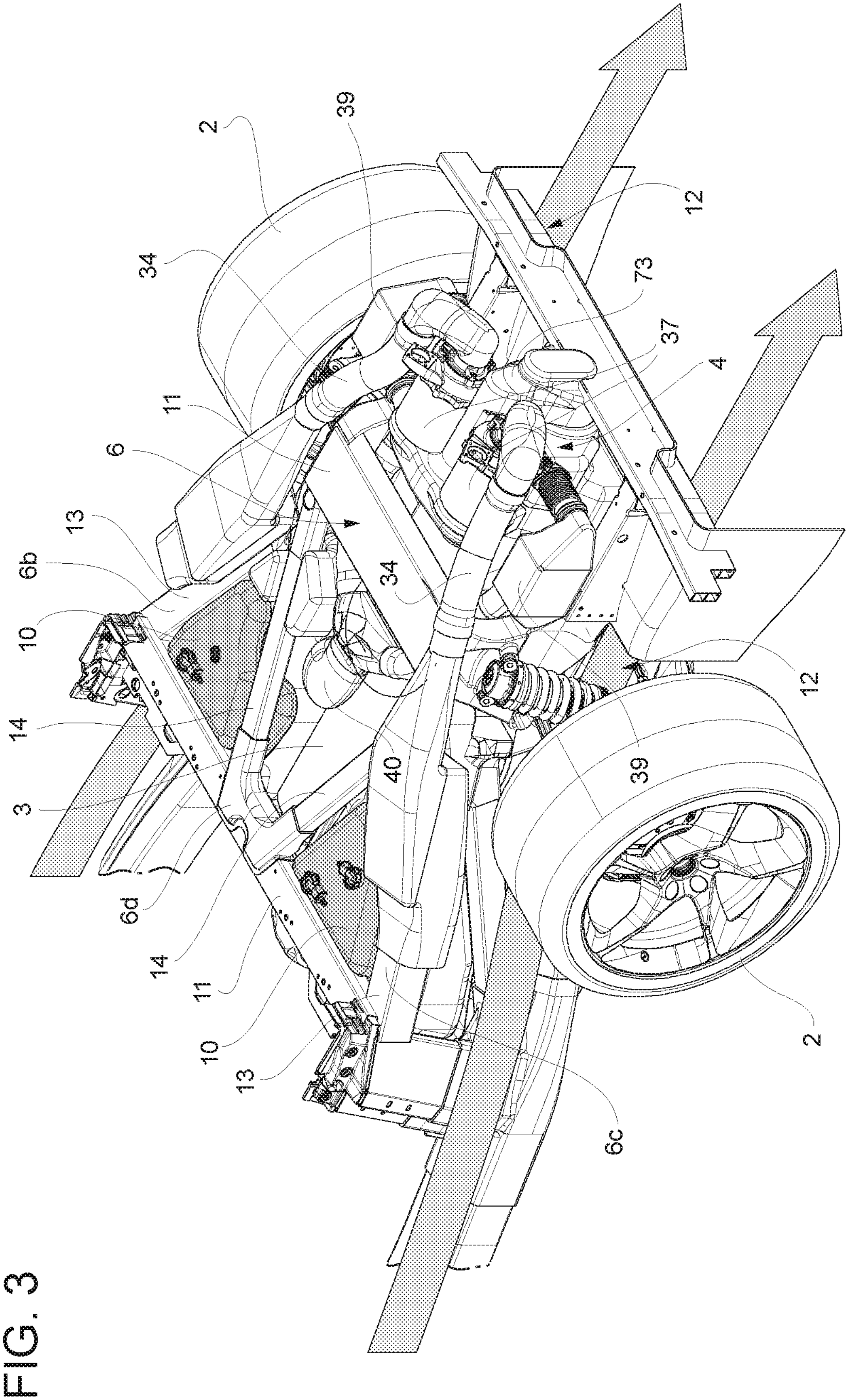
FIG. 3 is a perspective view from the back of the rear portion of FIG. 2.
Figure 4:
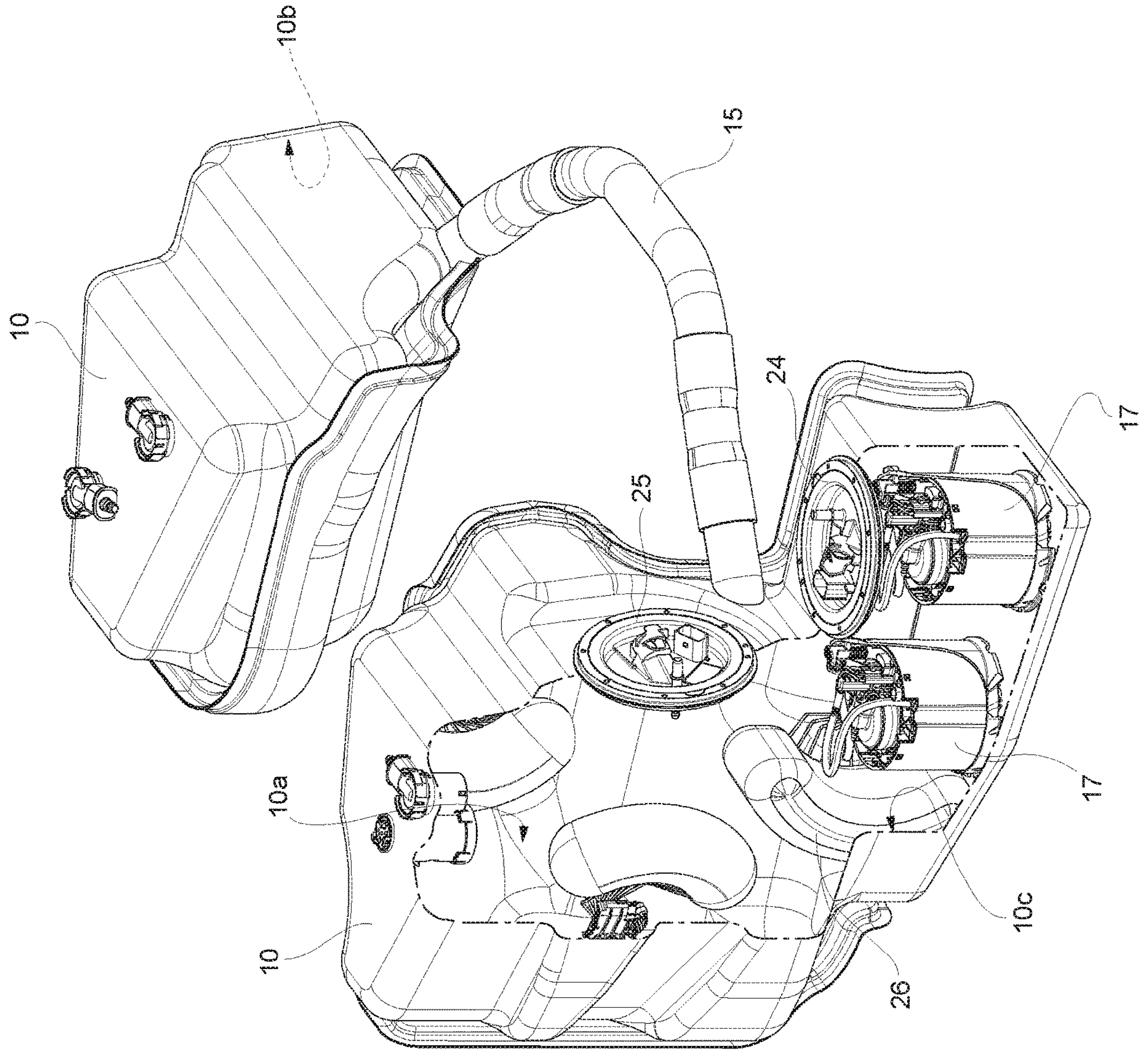
FIG. 4 is a perspective view, on a further enlarged scale, of a tank assembly of the motor vehicle, with at least one portion represented in cutaway.

According to what is illustrated in FIGS. 2 and 3, the intake assembly 29 comprises two intake lines 34, in particular arranged on both sides of the motor vehicle 1.

The intake lines 34 are configured to convey air to the intake manifold.

The intake lines 34 comprise respective ends defined by corresponding air intakes 35, in particular obtained through the vehicle body 7.

Each intake line 34 preferably comprises an air filter 36 at the respective air intake 35 to filter the air sucked in through the air intake 35 itself.

Each intake line 34 further comprises a compressor device 37 configured to increase the pressure of the air conveyed to the intake manifold in order to increase the volumetric yield of the cylinders 118.

Downstream of the relevant compressor device 37, each intake line 34 comprises a corresponding intercooler 39.

In other words, the intercooler 39 is arranged on the intake line 34 between the compressor device 37 and the intake manifold.

Furthermore, the intake lines 34 end downstream of the intercoolers 39 on a single intake duct 40, in particular immediately above the internal combustion engine 3.

In turn, the intake duct 40 is connected or communicating with the intake manifold.

The intake duct 40 is not essential, whereby the intake lines 34 could have ended directly in the intake manifold.

Alternatively, rather than in parallel as in the embodiment just described, the intercoolers 39 could have been arranged in series. In this case, the intake lines 34 would end at the compressor devices 37, while the intake duct 40 would connect both compressed air outlets of the compressor devices 37 to the intake manifold passing through the intercoolers 39 in series.

Preferably, the compressor devices 37 are arranged between the intercoolers 39 according to the pitch axis; in other words, the intercoolers 39 are at the respective opposite sides, in particular according to the pitch axis, of a compression assembly defined by the compressor devices 37.

If the motor vehicle 1 had only one compressor device 37, the compression assembly would be defined by such a compressor device 37. Also in this case, the relative intercooler 39 would be arranged side by side with the compression assembly, in particular according to the pitch axis, viz., at a side of the compression assembly, in particular at the outermost side along the pitch axis.

One or both intercoolers 39 are of the air/liquid type, particularly air/water.

This means, in more detail, that one or each of the intercoolers 39 has a first duct (not illustrated) for air, the first duct belonging to the intake line 34, and a second duct (not illustrated) for a coolant, in particular water, the second duct belonging to a cooling circuit (not illustrated) of the motor vehicle 1.

The first and the second duct are arranged in thermal contact with each other, so that the coolant through the second duct removes heat from the air compressed by the compressor device 37 through the first duct.

The cooling circuit is configured to circulate the coolant through the second duct. In particular, the cooling circuit comprises a radiator or heat exchanger configured to transmit heat from the coolant passed through the second duct to the air outside the motor vehicle 1.

Thereby, the intercoolers 39 can be smaller in size with respect to corresponding air/air type intercoolers. Therefore, since the intercoolers 39 are arranged at the sides of the compression assembly defined by the compressor devices 37, the overall dimensions of the intercoolers 39 and the compressor devices 37 according to the pitch axis is minimized. This allows a maximum tapering of the chassis 6 at the rear of the motor vehicle 1 and thus the effective formation of aerodynamic channels 12.

Figure 9:
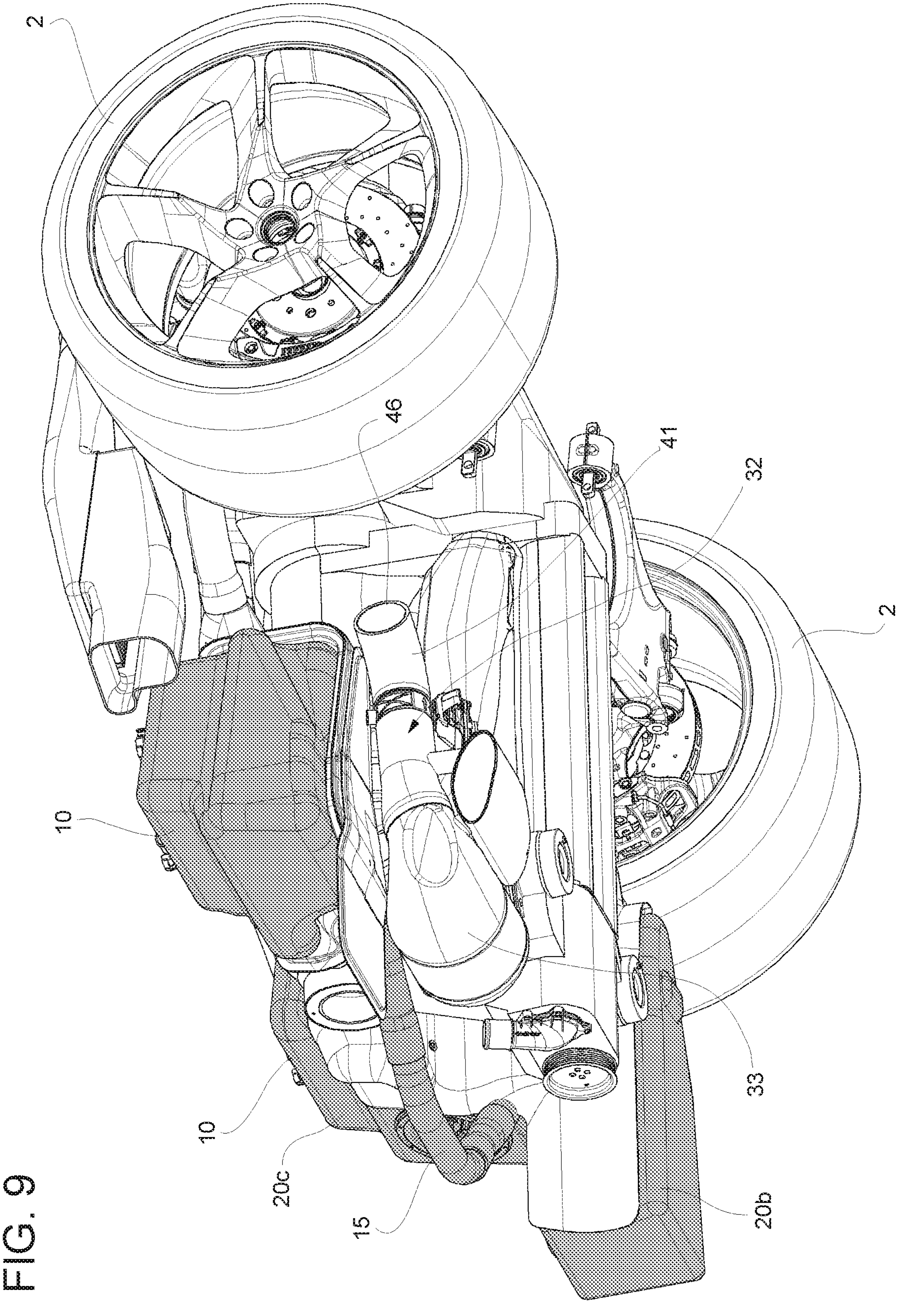
FIG. 9 is a perspective view, with parts removed for clarity, showing a detail below the tank assembly.

According to what is illustrated in FIG. 9, the exhaust assembly 32 comprises an exhaust duct 41 arranged to receive the exhaust gases from the cylinders 118 of the internal combustion engine 3.

The exhaust duct 41 is connected to the cylinders 118 by means of respective channels originating from the cylinders 118 and ending in an inlet of the exhaust duct 41.

The exhaust duct 41 comprises one or more exhaust gas treatment devices 33 arranged in series.

Downstream of the exhaust gas treatment devices 33, the exhaust duct 41 preferably ends with a single pipe opening into an outlet opening 46. According to other embodiments not illustrated, the exhaust duct 41 can terminate with several pipes opening into respective outlet openings 46.

Preferably, all the outlet openings 46 present are arranged at one of the sides of the cell **6*b* of the chassis 6**.

In other words, the outlet opening 46 is arranged asymmetrically at only one side of the motor vehicle 1 and is located between a rear wheel 2 and a front wheel **2*b* on the same side of the motor vehicle 1**.

In particular, the outlet opening 46 is obtained through one side of the vehicle body 7.

Preferably, the gearbox 4 is aligned with internal combustion engine 3 according to the roll axis, and is arranged behind the internal combustion engine 3. In particular, the gearbox 4 is aligned with an upper portion of the engine block (crankcase 117 and cylinder head 121) of the internal combustion engine 3. In other words, the gearbox 4 is aligned with the upper part of the crankcase 117.

More in particular, the gearbox 4 comprises at least one primary shaft (not illustrated) connected to the crankshaft 120 by means of a transmission of known type and not illustrated, e.g., comprising gears, and/or a bi-mass flywheel, and/or the like.

The gearbox 4 comprises an outer casing 73, which has a tapered shape towards the rear so that the height of the outer casing 73 gradually decreases from the front to the rear. In other words, a front wall of the outer casing 73 is more developed in height than a rear wall of the outer casing 73.

In particular, the outer casing 73 has a wall 74 below which is inclined with respect to the roll axis due to the tapered shape of the outer casing 73.

Furthermore, as can be seen in FIG. 3, the intercoolers 39 are arranged at the respective sides of the gearbox 4 (viz., at the sides of the outer casing 73 of the gearbox 4). In other words, each of the intercoolers 39 is independently arranged at one side of gearbox 4, i.e., it is at least partially aligned with the gearbox 4 according to the pitch axis.

In addition, the intercoolers 39 are preferably arranged above the gearbox 4 (viz., above the outer casing 73 of the gearbox 4). More specifically, at least one portion of the intercoolers 39 is arranged above or at a higher elevation with respect to that of the gearbox 4 or its outer casing 73, but the intercoolers 39 need not be entirely above the gearbox 4 or its outer casing 73, although they may still be so according to embodiments not illustrated.

According to the embodiment illustrated, the compression assembly comprising the two compressor devices 37, in particular twin or equal, is arranged behind (rear) the engine block (consisting of the crankcase 117 and the cylinder head 121) of the internal combustion engine 3, viz., behind the internal combustion engine 3.

In particular, the compression assembly is aligned with the internal combustion engine 3 or with the cylinders 118 arranged in-line, more in particular along a direction parallel or coinciding with the roll axis.

Furthermore, the compression assembly is arranged higher than the engine block of the internal combustion engine 3. In other words, at least one portion of the compression assembly or more specifically at least two respective portions of the compressor devices 37 are arranged above or at a higher elevation with respect to the engine block of the internal combustion engine 3.

Furthermore, the compression assembly is arranged higher than the gearbox 4 or its outer casing 73. In other words, at least one portion of the compression assembly or more specifically at least two respective portions of the compressor devices 37 are arranged above or at a higher elevation with respect to the gearbox 4 or its outer casing 73.

In particular, the compression assembly or a portion thereof is arranged immediately above the gearbox 4 or its outer casing 73.

Similarly, in particular, the intercoolers 39 are arranged higher than the engine block of the internal combustion engine 3 and are located behind the engine block of the internal combustion engine 3.

The compressor devices 37 comprise or are defined by two compressors, e.g., twins (identical). The two compressors are preferably turbomachines, more preferably centrifugal type compressors.

The compressor devices 37 are aligned with each other along the pitch axis, viz., side by side and arranged at the same height.

The compressor devices 37 are preferably powered by the internal combustion engine 3 or more precisely by means of the rotation of the crankshaft 120.

In other words, the compression assembly is connected to the internal combustion engine 3 in order to be fed by the same, viz., such that the internal combustion engine 3 feeds or drives the compression assembly.

In particular, the motor vehicle 1 comprises a transmission, more particularly of the gear type with a clutch, configured to selectively transmit (specifically when the clutch is engaged) at least part of the power delivered by the internal combustion engine 3 or the rotation of the crankshaft 120 to both compressor devices 37, thereby powering them.

More in particular, the latter transmission comprises the primary shaft of the gearbox 4. In other words, the compressor devices 37 receive power from the primary shaft of the gearbox 4.

According to alternative embodiments, the transmission comprises the gearbox 4 or a portion thereof, such that the rotation of the crankshaft 120 is transmitted to the compressor devices 37 in a reduced manner by means of one of the gears or transmission ratios of the gearbox 4.

Preferably, the motor vehicle 1 lacks turbochargers configured to supercharge the internal combustion engine 3.

In other words, the compressor devices 37 are not powered by turbines driven by the exhaust gases of the internal combustion engine 3.

This makes the turbines unnecessary, saving useful space, e.g., for defining aerodynamic channels 12 or tapering the chassis 6 towards the rear of the vehicle 1.

Preferably, the exhaust assembly 32 is at least partially housed within a compartment obtained below the second tank, as better visible in FIG. 9.

In particular, the compartment in which the exhaust assembly 32 is at least partially housed is arranged at the same elevation as the portion 10*c*, more in particular on the opposite side with respect to the internal combustion engine 3.

According to what is illustrated in FIG. 5, the motor vehicle 1 comprises a rear aerodynamic extractor 75 which faces, in use, the road travelled by the motor vehicle 1, starts at a rear wall of the engine block (comprising the crankcase 117 and the cylinder head 121) of the internal combustion engine 3, and is arranged below the gearbox 4 (viz., below the outer casing 73).

According to a preferred embodiment, the wall 74 of the outer casing 73 has the same inclination as the rear aerodynamic extractor 75.

In other words, the wall 74 reproduces the shape of the rear aerodynamic extractor 75, having the same inclination thereof. Thereby, the rear aerodynamic extractor 75 exploits all the available space below the gearbox 4 (viz., below the outer casing 73).

The extractor 75 is inclined with respect to the horizontal plane along which the bottom 8 extends.

From the above, the advantages of the motor vehicle 1 according to the invention are clear.

The arrangement of the intercoolers 39 with respect to the internal combustion engine 3 allows significant savings in dimensions with associated advantages in the freedom of positioning other auxiliary devices for the operation of the internal combustion engine 3.

This contributes to allowing the tapering of the chassis 6 with the consequent design of the aerodynamic channels 12.

More in general, the savings in dimensions are mainly ensured by the fact that the intercoolers 39 are of the air/liquid type or more precisely of the air/water type.

Finally, it is clear that modifications and variations can be made to the boost power device according to the invention without, however, departing from the scope of protection defined by the claims.

In particular, each of the devices depicted schematically in the figures is independent of the other details and is specifically designed to solve specific technical problems in isolation with respect to the other details.

Furthermore, the number of components described and illustrated could differ. In particular, this applies to all duplicate components, viz., twin or identical components. In fact, all the components mentioned in a number of two or more can be replaced by a single relative component. In other words, the number can be reduced to one.

The invention claimed is:

1. A motor vehicle comprising:
- an internal combustion engine comprising a crankcase and a plurality of cylinders within the crankcase;
- an intake assembly comprising an intake manifold communicating with the cylinders and at least one intake line configured to convey air to the intake manifold;
- wherein the intake line comprises a compression assembly configured to increase the pressure of the air conveyed to the intake manifold and at least one intercooler downstream of the compression assembly;
- wherein the compression assembly is arranged behind the internal combustion engine according to a roll axis of the motor vehicle; and
- wherein the intercooler is of the air/liquid type and is arranged side by side with the compression assembly according to a pitch axis of the motor vehicle.

2. The motor vehicle according to claim 1, wherein the compression assembly is aligned with the internal combustion engine along a direction parallel to the roll axis.

3. The motor vehicle according to claim 1, further comprising an additional air/liquid type intercooler, wherein the compression assembly is arranged between the intercoolers along the pitch axis of the motor vehicle.

4. The motor vehicle according to claim 1, further comprising a plurality of wheels and a transmission apparatus configured to connect the internal combustion engine to the wheels, the transmission apparatus comprising a gearbox aligned with the internal combustion engine according to the roll axis and arranged behind the internal combustion engine, wherein the intercooler is arranged side by side with the gearbox.

5. The motor vehicle according to claim 4, wherein at least a portion of the intercooler is arranged above the gearbox.

6. The motor vehicle according to claim 4, wherein the compression assembly has at least one portion arranged immediately above the gearbox.

7. The motor vehicle according to claim 1, wherein the compression assembly is connected to the internal combustion engine, such that the internal combustion engine drives, in use, the compression assembly.

8. The motor vehicle according to claim 1, wherein the internal combustion engine comprises a cylinder head coupled to the crankcase and arranged below the crankcase.

9. A motor vehicle comprising:
- a front;
- a rear;
- a first lateral side extending between the front and the rear;

a second lateral side extending between the front and the rear;

an internal combustion engine comprising a crankcase and a plurality of cylinders; and an intake assembly comprising:

an intake manifold in communication with the cylinders;

an intake line configured to convey air to the intake manifold;

a compression assembly configured to increase the pressure of the air conveyed to the intake manifold;

an intercooler downstream of the compression assembly;

wherein the compression assembly is arranged rearwardly with respect to the internal combustion engine according to a roll axis of the motor vehicle; and wherein the intercooler is an air/liquid type intercooler and is arranged laterally with the compression assembly according to a pitch axis of the motor vehicle.

10. The motor vehicle according to claim 9, wherein the compression assembly is operably connected to the internal combustion engine such that the internal combustion engine drives, in use, the compression assembly.

11. The motor vehicle according to claim 9, further comprising a plurality of wheels and a transmission apparatus, wherein the transmission apparatus is configured to operably connect the internal combustion engine to the wheels, the transmission apparatus comprising a gearbox aligned with the internal combustion engine according to the roll axis and arranged rearward to the internal combustion engine, and wherein the intercooler is arranged laterally with the gearbox.

12. A motor vehicle comprising:

a front;

a rear;

a longitudinal vehicle axis extending between the front and the rear;

a lateral vehicle axis orthogonal to the longitudinal vehicle axis;

a first lateral side extending between the front and the rear;

a second lateral side extending between the front and the rear;

an internal combustion engine comprising a crankcase and a plurality of cylinders; and an air intake comprising:

an intake manifold in communication with the cylinders;

an intake line configured to convey air to the intake manifold;

a compressor configured to increase the pressure of the air conveyed to the intake manifold; and an intercooler downstream of the compressor;

wherein the compressor is arranged at least partially rearwardly with respect to the internal combustion engine according to the lateral vehicle axis; and wherein the intercooler is an air/liquid type intercooler and is arranged at least partially laterally with respect to the compressor.

13. The motor vehicle according to claim 12, wherein the compressor is operably connected to the internal combustion engine such that the internal combustion engine drives, in use, the compressor.

14. The motor vehicle according to claim 12, further comprising a plurality of wheels and a transmission, wherein the transmission is configured to operably connect the internal combustion engine to the wheels, the transmission comprising a gearbox aligned with the internal combustion engine according to the lateral vehicle axis and arranged at least partially rearward with respect to the internal combustion engine, and wherein the intercooler is arranged at least partially laterally with respect to the gearbox.

15. The motor vehicle according to claim 8, wherein the cylinder head closes the cylinders from below.

* * * * *